(12) United States Patent
Aravamudan et al.

(10) Patent No.: US 7,174,364 B1
(45) Date of Patent: *Feb. 6, 2007

(54) COLLABORATIVE BROWSING

(75) Inventors: Murali Aravamudan, Freehold, NJ (US); Andreas Constantine Papanicolaou, Lincroft, NJ (US); Kumar K Vishwanathan, Holmdel, NJ (US)

(73) Assignee: AT&T Corp., New York, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/798,849

(22) Filed: Mar. 11, 2004

Related U.S. Application Data (63) Continuation of application No. 09/141,088, filed on Aug. 27, 1998, now Pat. No. 6,732,145.

(60) Provisional application No. 60/057,745, filed on Aug. 28, 1997.

(51) Int. Cl.
*G06F 15/16* (2006.01)
*G06F 3/00* (2006.01)

(52) U.S. Cl. ............... 709/203; 715/500; 715/751; 715/752; 715/753

(58) Field of Classification Search ........ 709/203–205, 709/217, 219, 248, 226; 715/500, 751–753; 725/112
See application file for complete search history.

(56) References Cited

U.S. PATENT DOCUMENTS

| | | | |
|---|---|---|---|
| 5,649,185 A * | 7/1997 | Antognini et al. | 707/9 |
| 5,861,883 A | 1/1999 | Cuomo et al. | |
| 5,862,330 A * | 1/1999 | Anupam et al. | 709/204 |
| 5,944,791 A | 8/1999 | Scherpbier | |
| 5,949,412 A * | 9/1999 | Huntsman | 715/740 |
| 5,991,796 A * | 11/1999 | Anupam et al. | 709/206 |
| 6,047,314 A * | 4/2000 | Pommier et al. | 709/205 |

* cited by examiner

*Primary Examiner*—Frantz B. Jean (57) ABSTRACT

The present invention is directed to a technique for collaborative browsing among users at two or more different PCs. In an illustrative system in accordance with the present invention, copies of selected URLs are shared among collaborating PCs, each of which uses the URL to retrieve the corresponding document. In this system, a PC is configured to select hyperlinks for itself and one or more other PCs. Each URL corresponding to a selected hyperlink is communicated via the Internet (using standard Internet protocols) to a server. The server broadcasts the URL to the collaborating PCs each of which retrieves the corresponding document in conventional fashion. The server knows the IP addresses of the collaborating PCs through a collaboration set-up process which occurs in advance of the actual collaborative browsing session.

20 Claims, 10 Drawing Sheets

COLLABORATIVE BROWSING

CROSS REFERENCE TO RELATED APPLICATIONS

This application is related to Provisional Application Ser. No. 60/057,745 filed on Aug. 28, 1997.

This application is a continuation of application Ser. No. 09/141,088, filed Aug. 27, 1998 now U.S. Pat. No. 6,732,145.

FIELD OF THE INVENTION

The present invention relates to Internet browsing and in particular multiple parties browsing the Internet collaboratively.

BACKGROUND OF THE INVENTION

Internet browsing is a well-known concept. In the typical browsing scenario, a user of a personal computer ("PC") establishes a connection to the Internet (from the user's PC) through an Internet Service Provider ("ISP"), such as AT&T WorldNet Service™. As part of establishing this connection, the user runs one of the many available Internet browser software programs, such as Netscape Navigator™ or Microsoft Internet Explorer™, on the PC. The user is presented with an initial "page" of information from an Internet server, usually associated with the user's ISP. This page is a display of a document communicated from the server in accordance with the well-known hypertext transfer protocol (HTTP). The document is expressed in hypertext mark-up language. (HTML) which is used by the browser in displaying the page (i.e., the document).

A displayed document may contain many elements such as text and images. The document may also contain "hyperlinks" to other pages on the Internet, as is well-known in the art. These hyperlinks may be selected by the user with use of the user's computer mouse. As is well-known, a hyperlink may be an object in the document (e.g., text, an image, a graphical design, etc.) which is associated with another document on the Internet (either accessible from the same or different server; a hyperlink might also represent a portion of the current document for display). When a hyperlink makes reference to another document, the selection of that hyperlink triggers the browser software's transmission of a Uniform Resource Locator (URL) over the Internet. The URL specifies, among other things, the address of the document the user wishes to retrieve for viewing. The server containing the document identified by the URL returns the document to the user's PC through use of the user's Internet Protocol (IP) address, which the server received along with the URL. A user can thus follow a type of trail, from one document to the next, through the selection of hyperlinks.

Browsing the Internet is a popular way for individuals to gather information on virtually any topic. However, the present system of Internet browsing is designed around a model of users browsing individually—that is, a single PC receiving a sequence of documents defined according to a sequence of hyperlinks selected at the PC. While two or more persons can sit at a single PC and together experience a sequence of documents corresponding to a sequence of selected hyperlinks, current browsers do not provide for collaborative browsing among users at different PCs.

SUMMARY OF THE INVENTION

The present invention is directed to a technique for collaborative browsing among users at two or more different PCs. In an illustrative system in accordance with the present invention, copies of selected URLs are shared among collaborating PCs, each of which uses the URL to retrieve the corresponding document. In this system, a PC is configured to select hyperlinks for itself and one or more other PCs. Each URL corresponding to a selected hyperlink is communicated via the Internet (using standard Internet protocols) to a server. The server broadcasts the URL to the collaborating PCs each of which retrieves the corresponding document in conventional fashion. The server knows the IP addresses of the collaborating PCs through a collaboration set-up process which occurs in advance of the actual collaborative browsing session.

BRIEF DESCRIPTION OF THE DRAWINGS

The initial digits of reference numerals of objects appearing in a given Figure refer to the Figure in which the objects appear.

DETAILED DESCRIPTION

A. Overview of the Illustrative System

The illustrative system in accordance with the present invention relates to multiple persons at different PCs browsing Internet (or intranet) servers in a collaborative fashion. The central idea is that there is a collaboration leader who controls the browsing for all collaborators. This is accomplished by a series of processes executed by software running on several computers. These processes effectively allow one person to have control of what others see on their browser displays. The identity of the collaboration leader is maintained by the collaboration server 10, and the server 10 maintains a state machine that controls the collaboration. The collaboration server 10 can therefore implement conference control policies that include token passing (to determine the collaboration leader), sub-conferencing (to share information with only a subset of the collaborators), etc.

Figure 1:
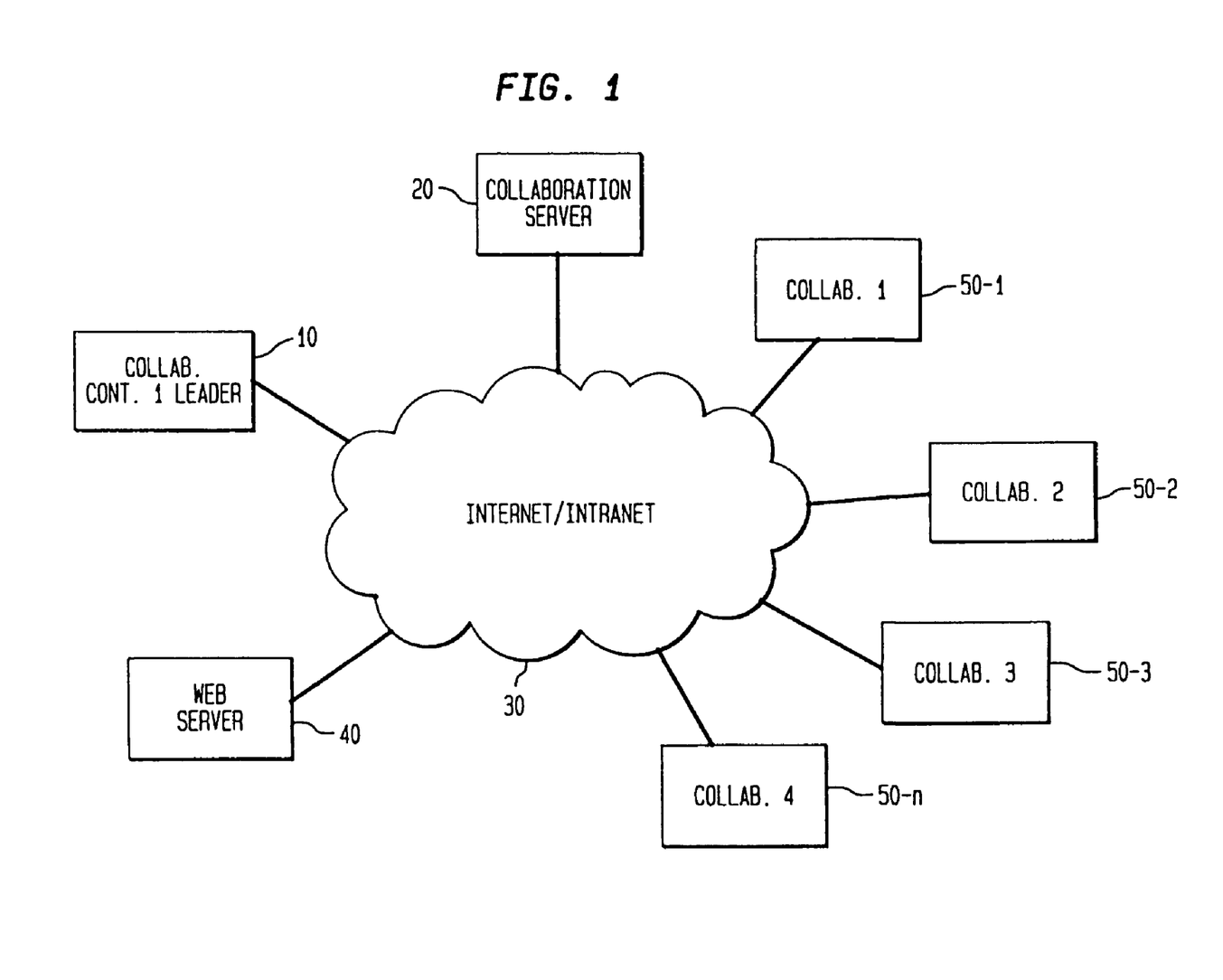
FIG. 1 presents a block diagram of an illustrative Internet communication system having cooperating elements performing collaboration in accordance with the present invention.

FIG. 1 presents a block diagram of an illustrative Internet communication system having cooperating elements performing collaboration in accordance with the present invention. As shown in the Figure, the system includes a communication network 30, such as an Internet or intranet, a collaboration server 20, a collaboration controller/leader 10, a web server 40, and one or more additional collaborators 50.

1. Some Useful Terminology

All those who participate in the collaboration process are "collaborators." The "collaboration controller" 10 is a collaborator who decides who, among those who are collaborating, will lead the collaboration. The collaboration controller 10 does this by designating the "collaboration leader." The "collaboration leader" is a collaborator who leads the browsing for the other collaborators 50. That is, the leader selects (or "clicks") on hyperlinks and HTML documents corresponding to such hyperlinks appear on the browser display of each of the collaborators 50. In a typical scenario (such as that shown in the Figure), the collaboration controller and leader 10 are one and the same, but they need not be. Collaboration leaders selected by the controller 10 lead the collaborative browsing for so long as the controller 10 desires. The controller 10 may remove leader status from a current leader and give such status to another collaborator (including the controller).

Although the terms "collaboration controller," "collaboration leader," and "collaborator" may be used to describe persons, the terms may also be used to describe the computers (typically PCs) used by such persons in the collaborative browsing environment. As will be discussed below, the collaborative browsing environment makes use of a client-server architecture. Collaborators are typically client platforms, while the other machines are servers, as their names indicate.

Multiple collaboration policies are possible. "Autocratic collaboration" is the type of collaboration introduced above which includes a controller, a designated leader, and collaborators. "Democratic collaboration" is a type of collaboration in which all collaborators can act as leaders. That is, any collaborator can click on hypertext and have the corresponding HTML page appear on the browser screens of the collaborators.

2. URL Trapping/Server Broadcasting

URL trapping is a basic function performed by collaboration leader 10. URL trapping is the idea that when the leader selects a hyperlink, the corresponding URL, which would ordinarily be transmitted to the specified web site, is intercepted (or "trapped") by software running on the leader client computer 10. This software acts to treat the URL as data to be sent in a packet through the Internet 30 (in conventional fashion) to a collaboration server 20. Software running on the collaboration server 20 determines which collaborator computers 10, 50 are involved in the collaboration. The software then loads the URL in packets for broadcast to each of the collaborators. In the example of FIG. 1, URLs are transmitted back to the leader 10 and to each of the four other collaborators 50. Each collaborator computer 10, 50 receives the URLs from the server 20. The software running on a collaborator computer (e.g., 50-1), having received the URL from the server 20, treats the received URL as though it had just been specified by a mouse click (selection) made by the user of that collaborator computer (50-1). Each collaborator then transmits the URL to the web server 40 and receives from that web server 40 the HTML document identified by the URL.

B. System Hardware

The illustrative system of FIG. 1 employs conventional hardware platforms. Each collaborator is typically a Pentium®-based PC (available from any of the many PC manufactures, such as Micron, Inc.; Gateway2000, Inc.; or Hewlett-Packard, Inc.) while each server is typically workstation-class computer (available from manufacturers such as Sun Microsystems, Inc. or Silicon Graphics, Inc.). Such machines are commonly used within the Internet and corporate intranets worldwide. Both PCs and servers have associated storage media for storing programs and data.

C. System Software Operation

The illustrative autocratic collaboration system discussed in this section operates in accordance with several computer software processes running on several computers. These processes include (i) Collaboration Session Set-Up; (ii) Collaboration Session Log-in; (iii) Collaboration Leader URL Trapping/Collaboration Server Broadcasting; (iv) Collaborator URL Selection Emulation; (v) Synchronize/Browse Away Control; and (vi) Leader Designation Control.

1. Collaboration Session Set-Up

Prior to an actual collaborative browsing session among collaborators, the collaboration server 20 must be informed of the parameters of such a session. This is referred to as collaboration session set-up. Collaboration session set-up is accomplished through an exchange of information between software processes running on the server 20 and the controller 10. The actual exchange of data occurs in conventional fashion employing TCP/IP (transfer control protocol/Internet protocol) and HTTP protocols over the network 30. An illustration of processes for performing collaboration set-up is presented in FIG. 2 (for the Controller 10) and FIG. 3 (for the Server 10).

The controller set-up process begins with the running of a World Wide Web browser at the controller client, such as a Java enabled Netscape Navigator or Microsoft Internet Explorer. In accordance with FIGS. 2 and 3, the set-up process begins with the selection of the Uniform Resource Locator (URL) of the server's 20 main (or "home") document (HTML or "web page"). Step 200. The selection of this URL could be accomplished in any of the conventional ways, such as "clicking" the left mouse button while the mouse pointer is positioned on a hyperlink of a displayed STET, manual entry of the URL in the browser "Location" dialog box, or clicking on a browser bookmark for the URL. This URL is then transmitted in conventional fashion to the server 20 via the network 30. Step 210. The controller 10 then waits for a response from the server 20 to the transmitted URL. Step 220.

Figure 2:
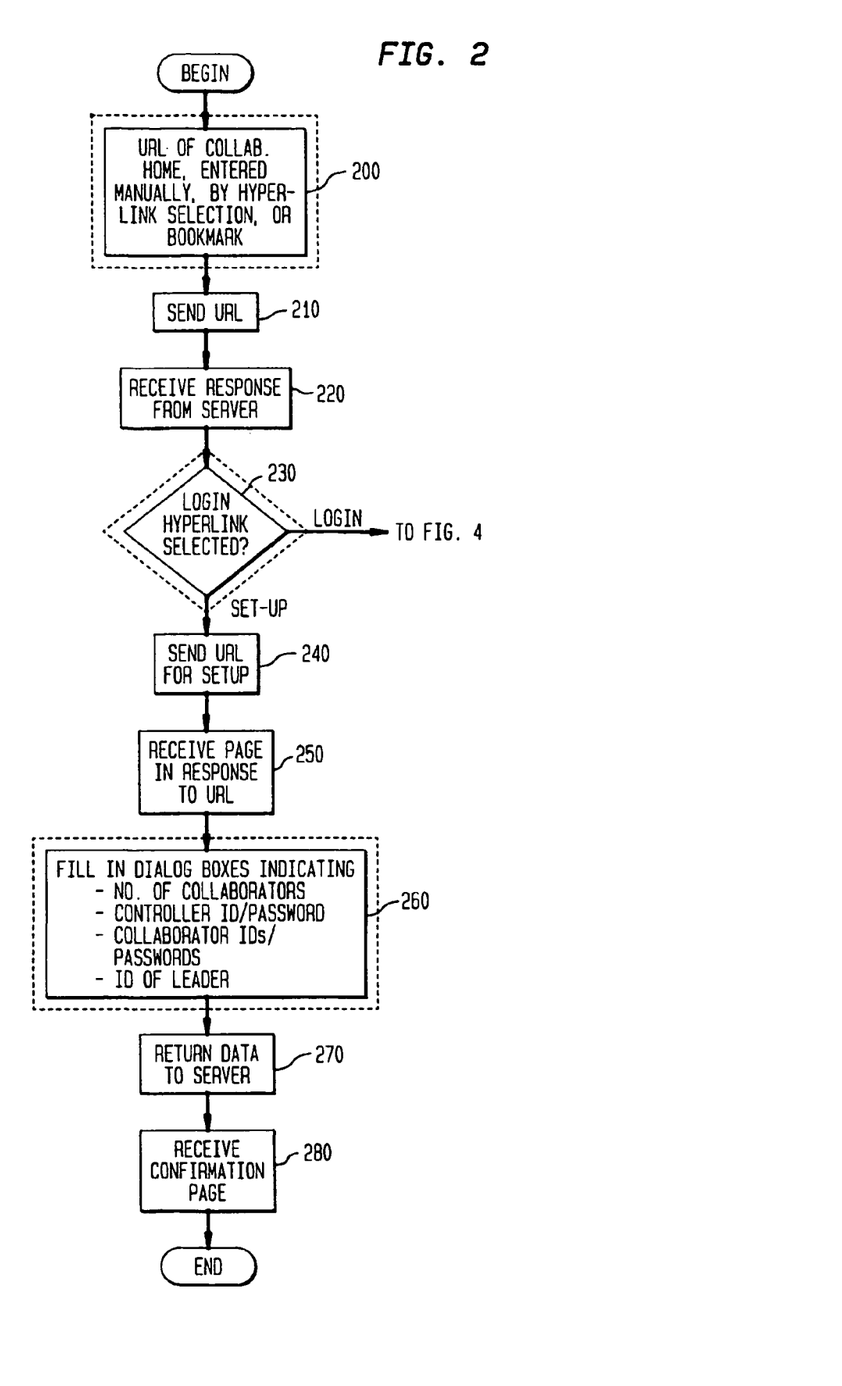
FIG. 2 presents an illustrative process for performing collaboration set-up by a collaboration controller.
Figure 3:
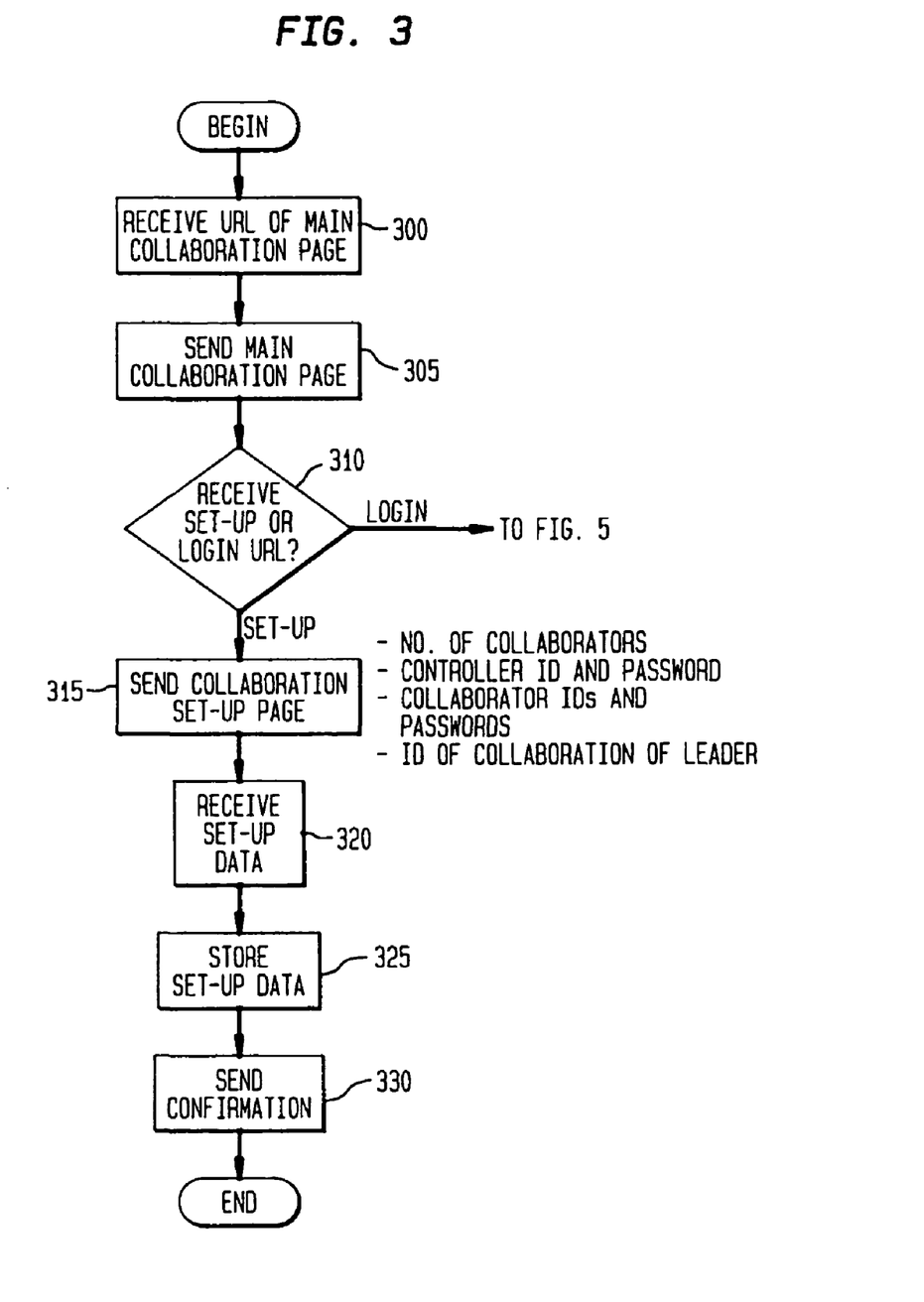
FIG. 3 presents an illustrative process for performing collaboration set-up by a collaboration server.

The server 20 receives the transmitted URL through its connection to the Internet. Step 300. In response to this received URL, the server 20 transmits the main collaboration STET back to the controller 10. Step 305. This main collaboration STET includes hyperlinks for web pages associated with collaboration set-up and collaboration log-in. The server 20 may receive either URL (i.e., set-up or log-in). Step 310. In this case, because set-up is desired by the controller 10, the hyperlink for the set-up page is selected by the controller and the corresponding URL is transmitted to the server 20. Steps 230 and 240. The controller 10 then waits for a response to the transmitted URL. Step 250.

Upon receipt of the set-up URL by the server 20, the server 20 responds by returning to the controller 10 a collaboration set-up page. Steps 310, 315. The collaboration set-up page includes dialog boxes which can be used to specify parameters for the collaboration. These include the number of collaborators; the controller's identifier (ID) and self-specified password; IDs for each of the other collaborators 50, as well as controller-defined passwords for each of the collaborators; and the ID of the collaboration leader (which if not defined will be the controller 10 by default).

In response to the controller's 10 receipt of the set-up page from the server 20, the controller 10 provides the data requested by the dialog boxes on the set-up page. Steps 250, 260. This data is then returned to the server 20. Step 270. The server 20 receives the data and stores the data (in its associated storage medium, not shown) as a collaboration table under a designation of the controller 10. Step 320 and 325. The collaboration table thus includes row entries for each collaborator, the entries comprising a collaborator ID, a collaborator password, and a designation indicating whether the collaborator is a collaboration leader. As discussed below, the entries will also include a collaborator's IP address (which is obtained subsequently as part of collaboration session log-in). The table includes the controller's designation to enable the table to be accessed later during collaboration log-in (see discussion below). The server 20 then transmits back to the controller 10 a page confirming set-up of the collaboration session. The controller 10 will then receive the confirmation. Step 280.

2. Collaboration Session Log-in

Collaboration session log-in is the process by which collaborators register their presence for a collaboration session. Prior to session log-in, the controller informs other collaborators 50 of their Ids and passwords registered with the collaboration server 20 as part of the set-up process above. This could be done by telephone, e-mail, or any other technique. For all collaborators 10, 50, the log-in process begins with steps 200–230, FIG. 2, as discussed above. For the server 20, the process begins with steps 300–310, FIG. 3, as discussed above. That is, a collaborator 10, 50 enters and sends the home page URL for the collaboration server 20 and waits for a response; the server 20 receives the URL and returns the home collaboration page to the collaborator 10, 50; Unlike the process discussed above, however, this time the collaborator 10, 50 selects the "log-in" hyperlink on the home page.

Figure 4:
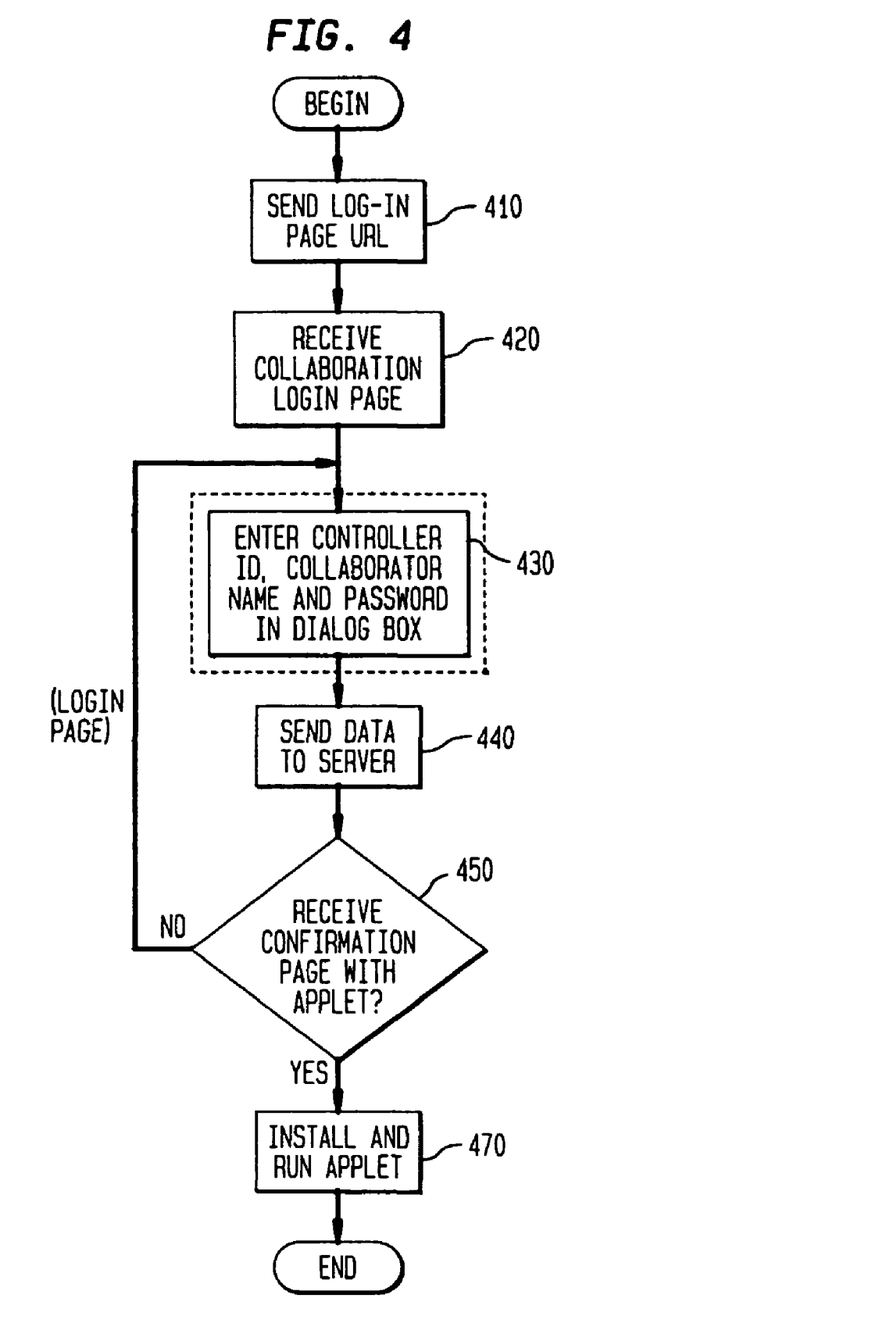
FIG. 4 presents an illustrative process for performing collaboration log-in by a collaborator.
Figure 5:
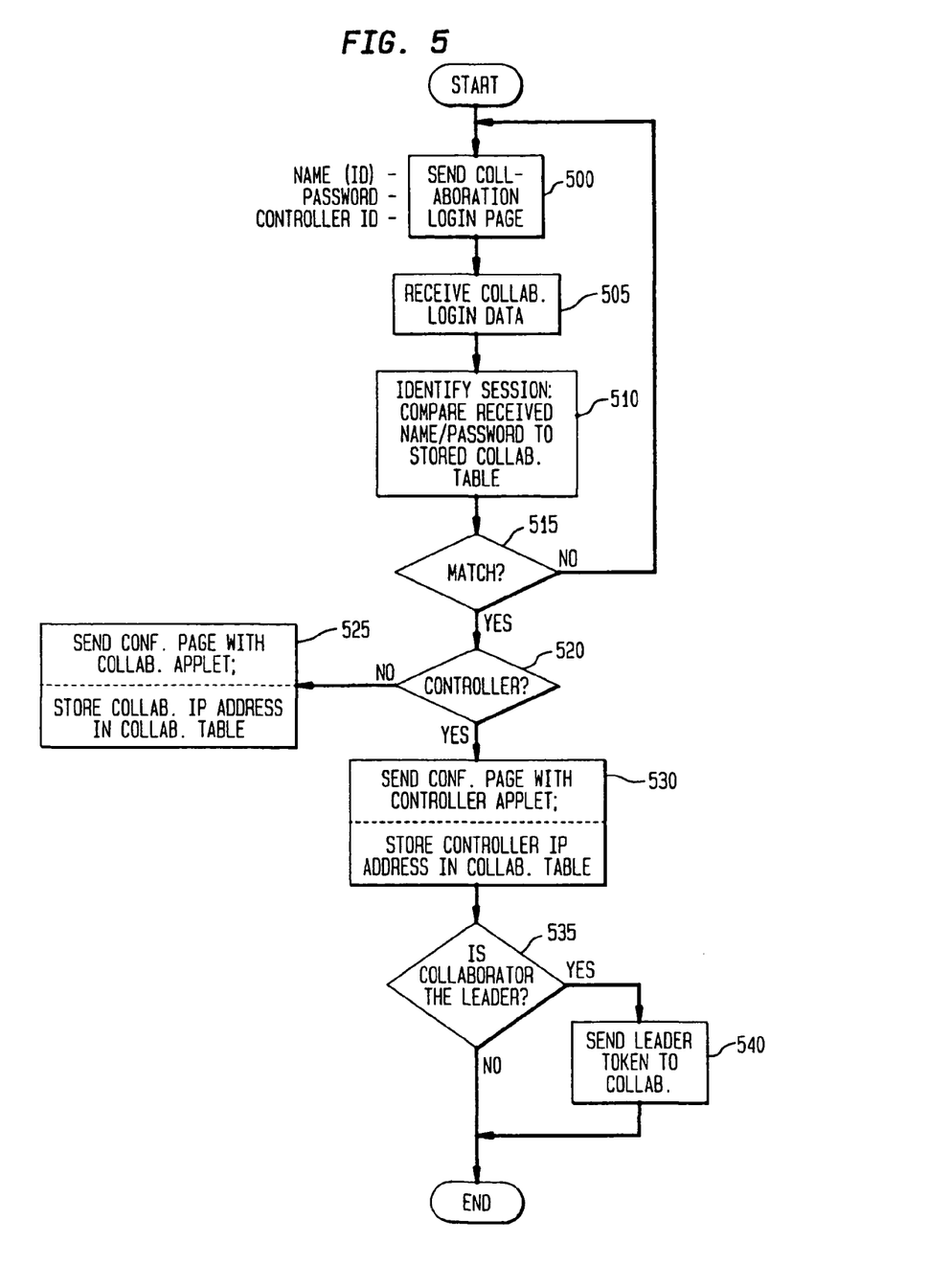
FIG. 5 presents an illustrative collaboration server process to accomplish log-in of collaborators.

With reference to FIG. 4, the corresponding log-in URL is sent to the server 20 in response to the collaborator's 10, 50 selection of the log-in hyperlink. Step 410. As shown in FIG. 5, the server 20 responds to the receipt of the log-in URL (step 310) by sending to the collaborator the associated collaboration log-in page. Step 500. This page includes dialog boxes soliciting the ID and password of the collaborator 10, 50, as well as the controller's ID. The controller ID is sought to simplify accessing the appropriate collaboration table from what may be many stored collaboration tables in the memory of the collaboration server 20.

The collaborator 10, 20 receives the collaboration log-in page from the server 20, and proceeds to enter the collaborator's ID and password, and the controller's ID. Step 420 and 430. This data is then sent to the server 20. Step 440. Once the server 20 receives the collaboration log-in data from the collaborator (step 505), the server 20 compares the received controller ID to the stored collaboration tables to identify the collaboration session which the collaborator 10, 50 desires to join. Once identified, the server 20 compares the ID and password of the collaborator 10, 50 to the stored ID and password in the collaboration table. Step 515. If there is no match, the server 20 returns the collaboration log-in page to the collaborator 10, 50. Steps 515, 500. If there is a match, the server tests to determine whether the collaborator 10, 50 is the controller 10. Step 520.

If the collaborator 10, 50 is the controller 10, a controller collaboration confirmation page is returned to the controller 10 with a controller collaboration Java applet. Also, the controller's IP address is stored in the collaboration table associated with the controller's ID and password. Step 530. If the collaborator 10, 50 is not the controller 10, a collaborator confirmation page is returned to the collaborator 50 with a collaborator collaboration Java applet. In addition, the collaborator's IP address is stored in the collaboration table associated with the collaborator's ID and password. Step 525.

Finally, the server 20 checks the collaboration table to determine whether the collaborator 10, 50 has been designated as the session leader at the outset of the collaboration. Step 535. If so, a leader token is sent the collaborator 10, 50. Step 540. This token will be recognized by the above-referenced collaborator/controller applet allowing the collaborator to operate in URL Trapping mode (see discussion below). For purposes of this description, the controller 10 will serve as the leader.

Referring to FIG. 4, if the collaborator receives a log-in confirmation page (as a result of server steps 525/530), the Java applet is installed in the collaborator's browser and run. Step 470. Should the collaborator be the leader 10 (by receipt of the leader token), the applet will perform URL Trapping, as discussed below. If the collaborator does not receive the confirmation page, but rather the collaboration log-in page, steps 430 and 440 will have to be repeated.

The above process is repeated for each collaborator wishing to take part in the collaboration. As discussed below with reference to Collaboration Server Broadcasting, all collaborators who are logged-in will receive (by server 20 broadcast) a URL trapped by the leader. Thus, it does not matter whether all those whom the controller 10 specified in the set-up process (FIGS. 2 and 3) are logged-in to the collaboration session. If a collaborator 10, 50 was specified in the set-up process and has logged-in, that collaborator 10, 50 will receive a trapped URL through a server 20 broadcast.

3. Collaboration Leader URL Trapping/Collaboration Server Broadcasting

Once the collaboration leader has logged-in, the leader may begin URL trapping. For purposes of this description, it will be assumed that all collaborators 10, 50 who desire to participate in the collaborative browsing session have logged in with the server 20. However, as a practical matter, all that is needed is one other collaborator. Organization and coordination among all collaborators may be accomplished by telephone conference call, e-mail, etc.

Figure 6:
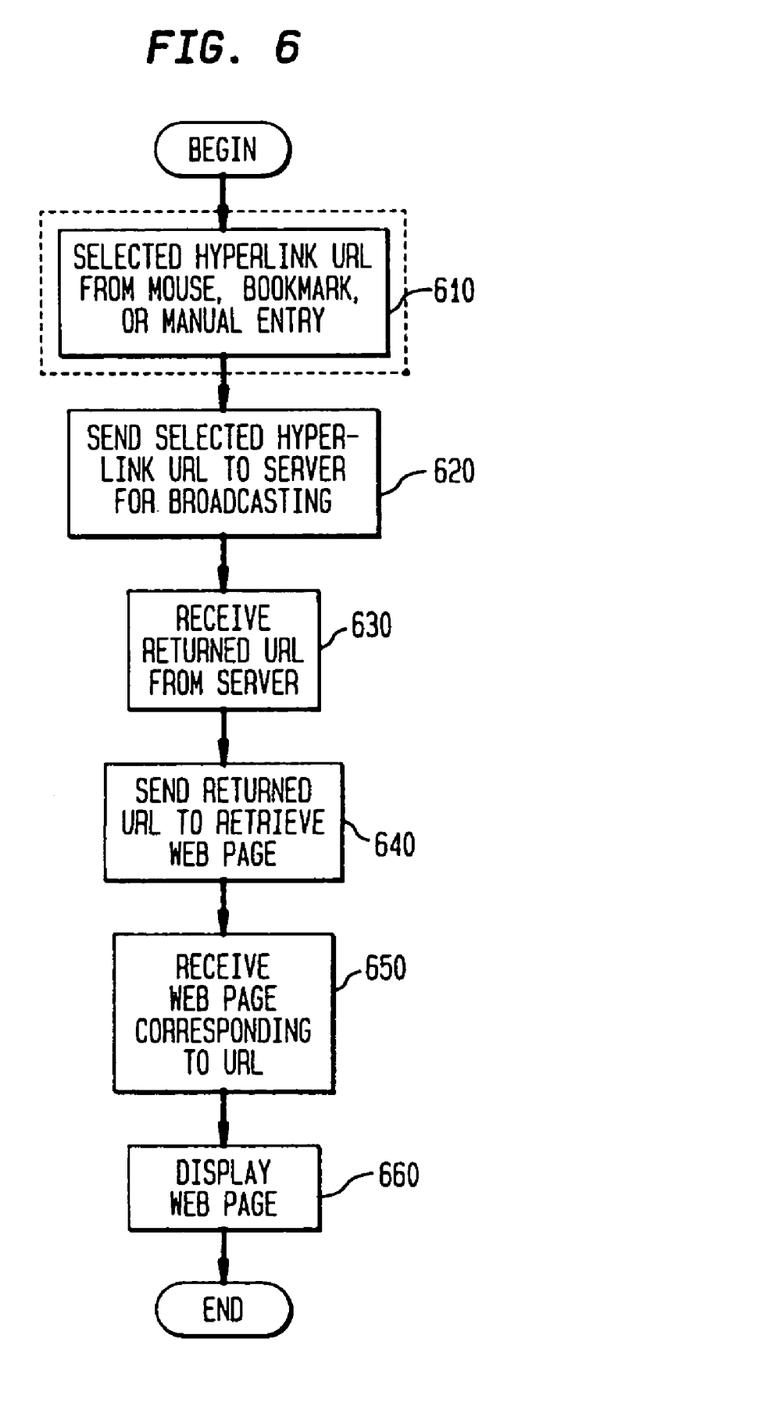
FIG. 6 presents an illustrative process by which a collaboration leader provides a URL to the collaboration server for sharing with other collaborators.

URL trapping is depicted in FIG. 6. At the outset, the leader, who is running a browser with the an applet having a leader token received from the server 20 (steps 525–540), selects a hyperlink in any of the typical ways (such as, for example, clicking on a displayed hyperlink, selecting a bookmark, entering a URL in the location dialog box of the browser). Step 610. This selected hyperlink is not communicated to the corresponding web server 40, as would be the case in ordinary browsing. Rather, the browser with the applet in possession of the leader token treats this URL as data to be sent to the server 20. That is, the URL is "trapped" and redirected to a different destination (specified by the IP address of the server 20). Step 620.

Figure 7:
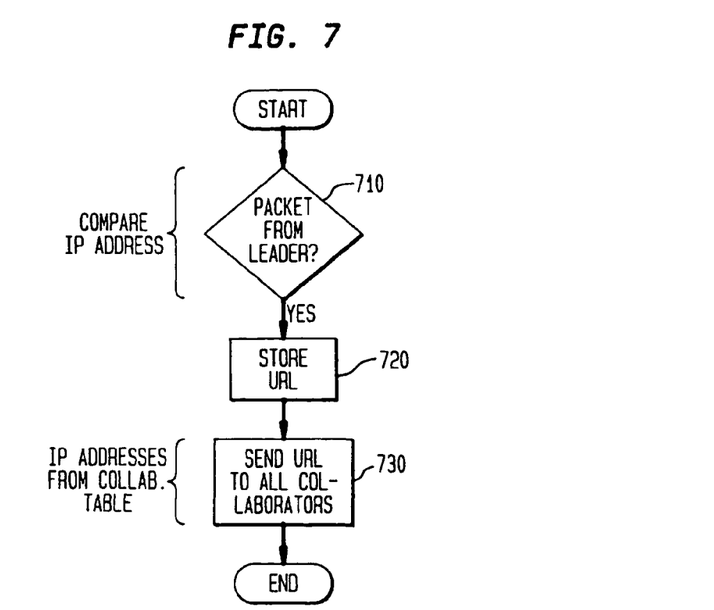
FIG. 7 presents an illustrative process by which the collaboration server provider a URL to collaborators.

As shown in FIG. 7, this URL is received by the server 20 and stored. The server knows the IP address of the leader and can therefore check to see if a received packet is from the leader. Steps 710 and 720. The server URL broadcasts to all collaborators who have logged-in to the collaboration session. The controller does this by searching the collaboration session table for the IP addresses of all collaborators who have logged-in. These IP addresses are used to address packets for each of the collaborators. Step 730.

4. Collaborator URL Selection Emulation

Non-leader collaborators 50 do not perform URL trapping; this is done only by a collaborator designated as a leader 10. However, for synchronization purposes, both the leader and non-leader collaborators obtain web pages by the use of URLs received from the server 20 (the URL having been trapped by the leader, sent to the server 20 by the leader 10, and broadcast to all logged-in collaborators, including the leader 10).

As shown in FIG. 6, the leader performs its own URL selection emulation. The leader receives a broadcast URL from the server 20. Step 630. The leader's applet then sends the received URL to the web server 40 identified by the URL. Step 640. Once the leader receives the web server's web page (step 650), the leader's browser displays the web page in conventional fashion.

Figure 8:
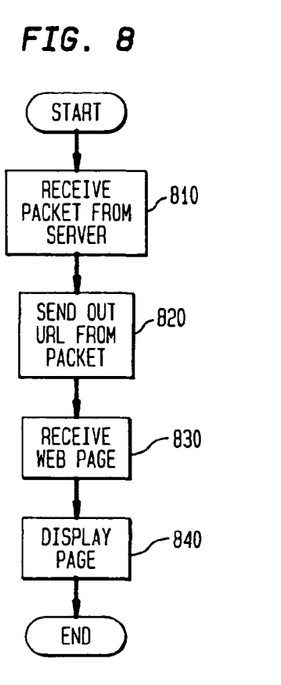
FIG. 8 presents an illustrative process by which a collaborator obtains documents specified by URLs received from the collaboration server.

FIG. 8 presents the URL selection emulation of a non-leader collaborator 50. Like the leader, the non-leader collaborator 50 receives the broadcast URL from the server 20. Step 810. In response to the received URL, the collaborator's applet sends the received URL to the web server 40 identified by the URL. Step 820. When the web page is received from the server 40 (step 830), the page is displayed in conventional fashion by the browser. Step 840.

5. Synchronize/Browse Away Control

While the leader 10 is responsible for controlling the collaborative browsing activity for all collaborators 50, any collaborator may, if the collaborator so chooses, ignore the sequence of broadcast URLs from the collaboration server 20, and browse the Internet as on its own during the collaboration session. This is done by employing the "browse away" feature of the collaborator's browser applet (when not in possession of the leader token). For non-leader collaborators 50, the applet running with the browser allows the selection of two modes of operation—a "synchronization" mode and a "browse away" mode. These modes may be selected by the user in any suitable way (e.g., display of buttons (in a segment of the browser display) for each mode. These buttons can be depressed to indicate the desired mode to the applet).

The operation of the applet for synchronization mode is discussed above with reference to FIG. 8. In this mode the collaborator 50 receives the broadcast URL from the server 20 and applet running with the collaborator's browser treats the URL as though it had been selected locally (by a mouse click, bookmark selection, etc.).

Figure 9:
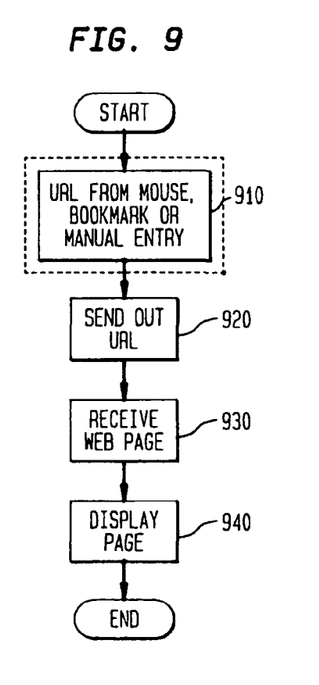
FIG. 9 presents an illustrative process by which a collaborator may browse independently during a collaboration session.

The applet for the browse away mode functions in accordance with FIG. 9. Given that the browse away mode has been identified to the applet (through, for example, the user selecting the "browse away" button), the applet allows the browser to function as though there were no collaboration session is progress. That is, broadcast URLs from the server are ignored. Moreover, URLs selected locally at the collaborator (through a mouse click, bookmark selection, or a manual entry of a URL) are sent to the associated web server (steps 910–920) and received web pages from the web server are displayed (steps 930–940).

Figure 10:
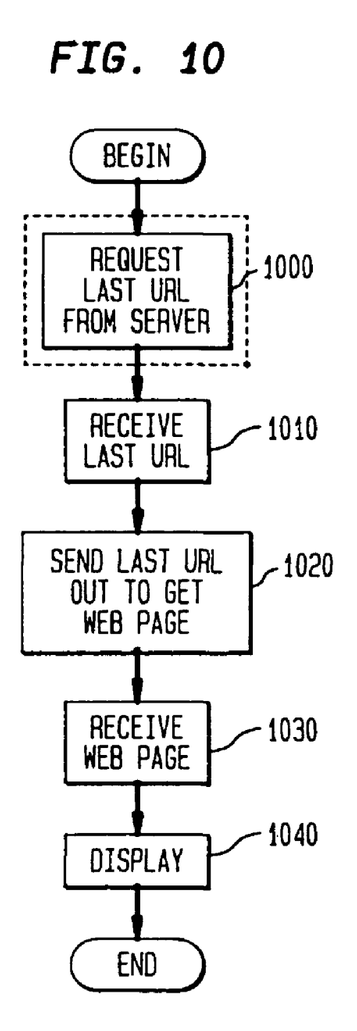
FIG. 10 presents an illustrative process by which an independently browsing collaborator rejoins a collaboration at the document currently being viewed by other collaborators.
Figure 11:
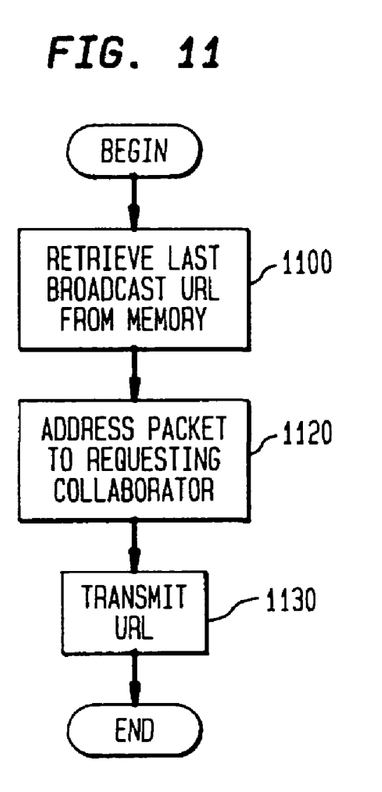
FIG. 11 presents an illustrative process by which the collaboration server facilitates an independently browsing collaborator to rejoin the collaboration at the current document.

For a collaborator who has been browsing away from the collaboration session, it is desirable to allow a quick "re-synchronization" process so that the collaborator can quickly "catch up" to the rest of the collaborators. The applet for the re-synchronize process functions in accordance with FIG. 10. The salient aspect of this process is the transmission to the collaboration server 20 of a packet requesting a copy of the last URL broadcast to the collaborators. Step 1000. As shown in FIG. 11, the server 20 retrieves the last broadcast URL from server memory. Step 1100. This URL was previously stored by the server 20 at step 720 as part of the URL broadcasting process. The server 20 then transmits the last broadcast URL to the requesting collaborator. Steps 1120–1130. In response to receipt of this URL by the requesting collaborator, the collaborator sends this URL to the associated web server 40. Step 1020. Upon receipt of the web page from the server 40, the page is displayed. Step 1040.

6. Leader Designation Control

Figure 12:
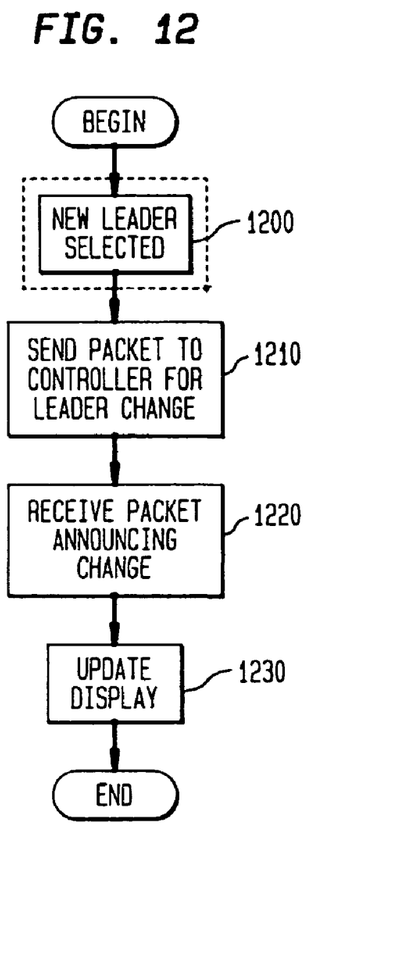
FIG. 12 presents an illustrative software process by which a collaboration controller designates the collaborator to lead the collaboration.
Figure 13:
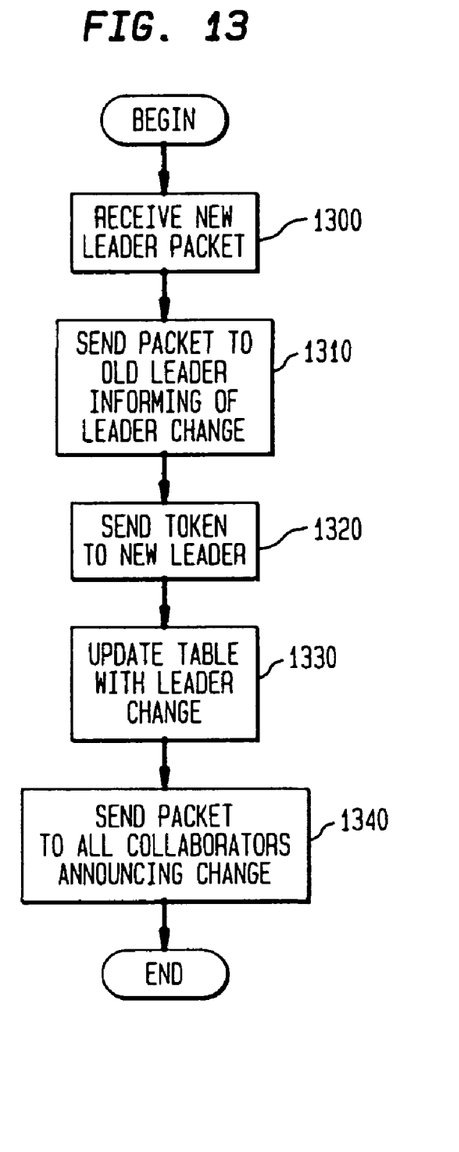
FIG. 13 presents an illustrative software process by which the collaboration server facilitates a change in the designation of the collaborator leading the collaboration.
Figure 14:
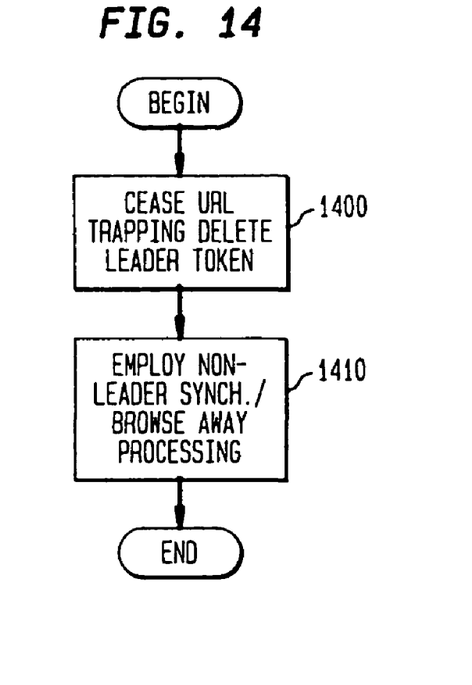
FIGS. 14–15 present illustrative processes by which a current collaboration leader and new collaboration leader, respectively, respond to a change in collaboration leader designation.
Figure 15:
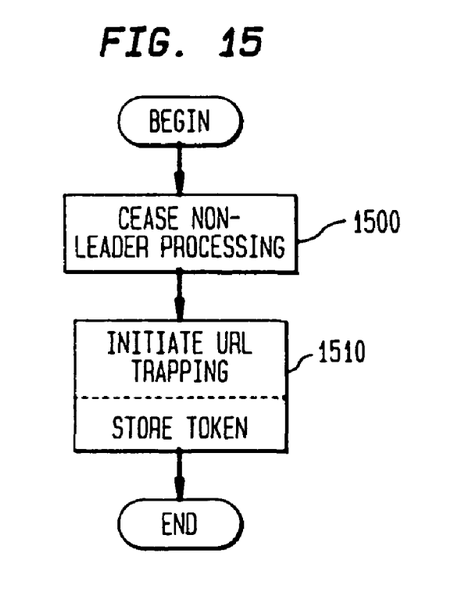

As discussed above, the controller 10 has the power to designate new leaders in a collaborative browsing session. This is done by the applet software of the controller, current leader, and new leader, as well as the software running on the server 20. See FIGS. 12–15. As shown in FIG. 12, the controller initiates a change in leader designation by selecting a new leader. Step 1200. The identity of the newly selected leader is then communicated to the server. Step 1210. As shown in FIG. 13, the server 20 receives the new leader identification information and sends a packet to the current leader (based on the new leader's IP address from the collaboration table) informing the current leader of the change of leader status. Steps 1300–1310. The server 20 then sends a new leader token to the new leader (also with use of an IP address from the table). Step 1320. The server then updates the collaboration session table with the new leader information (to remove leader status from the current leader and apply that status to the new leader).

In response to receiving a message that it is no longer the current leader, the current leader deletes the leader token from memory and ceases URL trapping. Step 1400. The former leader initiates the applet processes presented in FIGS. 8–10 for non-leader collaborator participation in the collaboration session. Step 1410. In a complementary fashion, the new leader ceases non-leader collaborator participation, and initiates the applet process for URL trapping as shown in FIG. 6. Step 1510.

Once the current and new leaders have been informed of the change in leader status (as per steps 1310–1320), the server 20 updates the collaboration session table to reflect the new leader status. Step 1330. The server 20 then communicates the change in leader status to all collaborators (collaborators can use this information in the collaboration session display to show who is serving as the leader). Step 1340. For example, as shown in FIG. 12, the controller receives the packet announcing the change in leader status and updates the collaboration display. Steps 1220–1230.

D. Discussion

The collaborative browsing discussed in detail above is autocratic collaborative browsing. That is, there is but one leader (at any one time; selected by the controller) selecting the pages to be viewed by other collaborators. Another type of collaborative browsing which may be employed is democratic collaborative browsing. In democratic collaborative browsing, all collaborators may act as leaders. This may be accomplished by providing all collaborators with leader tokens. Any collaborator may then select a hyperlink for viewing by all other collaborators in the session. All collaborators perform URL trapping (as discussed above) whenever they select a hyperlink. All collaborators who do not select a hyperlink act as non-leader collaborators. This is accomplished implicitly in the embodiment discussed above since leaders obtain pages as a result of receiving a URL from the collaboration server and using that URL to obtain the page.

The collaborative browsing process can be accomplished with a simultaneous conference call among the parties. This conference call may be established in conventional fashion, such as with the use of a teleconference service available from AT&T Corp.

Those skilled in the art will appreciate that although the invention is described in detail above with respect to collaborative browsing of the internet, the invention is equally applicable to any collaboration implemented by managing the distribution of pointers to information available for collaborative browsing. For example, URLs are the standard Internet instance of pointers to information, but proprietary systems such as Lotus Notes or shared file systems with a common name space could be used as well in the manner described above for collaborative browsing. In that case, the URLs would be replaced with the appropriate entity in the name space of the alternate system.

What is claimed is:

1. A method for facilitating collaborative viewing by at least first and second collaborators at respective at least first and second clients in communication with a network of at least one resource available from at least one server computer in communication with a network, the method practiced at a collaboration server in communication with said network, the method comprising the steps of receiving from at least one of said clients at least one resource selection message comprising information identifying said at least one resource, responding to said at least one resource selection message by generating at least one locator message addressed to said at least first and second clients, each of said locator messages comprising at least one locator associated with said at least one resource, and sending said locator messages to said network for delivery to said at least first and second clients.

2. The method of claim 1 wherein said collaboration server and at least one of said clients are co-located.

3. The method of claim 2 wherein said collaboration server and said at least one of said clients are resident in the same computer.

4. The method of claim 1 wherein said at least one resource comprises at least one hypertext document having an associated URL.

5. The method of claim 1 wherein said at least one resource comprises a plurality of documents, the ordered selection of which is controlled by said at least one resource selection message received from said at least one of said clients.

6. The method of claim 5 wherein, at any particular time, said responding is limited to responding to resource selection messages received from exactly one of said clients.

7. The method of claim 6 wherein, said exactly one of said clients is a collaboration leader.

8. The method of claim 7 wherein a new collaboration leader is designated for subsequent time by a currently received new-leader message received from a current collaboration leader designating said new collaboration leader, said collaboration server responding to said new-leader message by sending a notification message to said network addressed to each of said collaborators to announce the new leader, the one of said notification messages to said new leader including a token empowering said new leader with status as a collaboration leader.

9. The method of claim 5 wherein, at any particular time, resource selection messages may be received from more than one of said clients.

10. The method of claim 5 wherein said plurality of documents is identified in said at least one resource selection message.

11. The method of claim 1 wherein said at least one resource selection message further comprises information identifying a plurality of collaborators to whom said resource locator message is to be sent.

12. The method of claim 1 wherein said resource selection message is associated with a collaboration session, and wherein said resource selection message further comprises session identification information, said session identification information identifying said plurality of collaborators and authentication information available to said collaboration server relating to each of said plurality of collaborators.

13. The method of claim 12 wherein said authentication information is based on information received from at least one of said clients prior to receipt of a resource selection message associated with said session.

14. The method of claim 12 wherein said resource locator message is sent to said network for delivery to particular collaborators only after the identity of said particular collaborators have been authenticated.

15. The method of claim 12 wherein said generating a locator message addressed to said at least first and second clients comprises receiving from a database identification information for a plurality of collaborators associated with said session.

16. The method of claim 15 further comprising receiving addresses for said plurality of collaborators from a database.

17. The method of claim 1 wherein said locator messages identify resources that can be viewed at by client using browser software.

18. The method of claim 1, wherein said sending locator messages to said network comprises sending Internet Protocol messages to said network.

19. The method of claim 1, wherein said at least one resource comprises at least one World Wide Web page comprising information formatted as hypertext protocol information.

20. The method of claim 1 wherein said at least one locator message addressed to said at least first and second clients is addressed to respective IP addresses of each of said at least first and second clients.

* * * * *